United States Patent [19]

Rosansky et al.

[11] 3,783,666
[45] Jan. 8, 1974

[54] APPARATUS FOR FABRICATING LITHIUM ANODES

[75] Inventors: Martin G. Rosansky, Monsey; Bruce E. Jagid, Whitestone, both of N.Y.

[73] Assignee: Power Conversion, Inc., Tuckahoe, N.Y.

[22] Filed: Dec. 1, 1971

[21] Appl. No.: 203,530

[52] U.S. Cl................... 72/199, 72/366, 156/555, 100/153, 100/118, 29/521
[51] Int. Cl............................................. B21b 1/00
[58] Field of Search................ 72/199, 366, 465; 29/423, 521; 100/151, 152, 118, 153; 156/489, 555, 580

[56] References Cited
UNITED STATES PATENTS

| | | | |
|---|---|---|---|
| 3,652,317 | 3/1972 | Porta et al. | 29/423 |
| 3,613,564 | 10/1971 | Adamski et al. | 100/118 |
| 3,446,139 | 5/1969 | Coffelt | 100/118 |
| 3,152,941 | 10/1964 | Sherman et al. | 156/555 X |
| 3,638,562 | 2/1972 | Karaghrosoff | 100/118 |
| 3,245,862 | 4/1966 | Olij et al. | 156/55 |

Primary Examiner—Milton S. Mehr
Attorney—Sandoe, Hopgood & Calimafde

[57] ABSTRACT

An apparatus and method for rolling and laminating highly malleable metals such as lithium. A plastic belt is interposed between the rollers and the lithium during the rolling operation to prevent the lithium from adhering to the roller surfaces.

7 Claims, 5 Drawing Figures

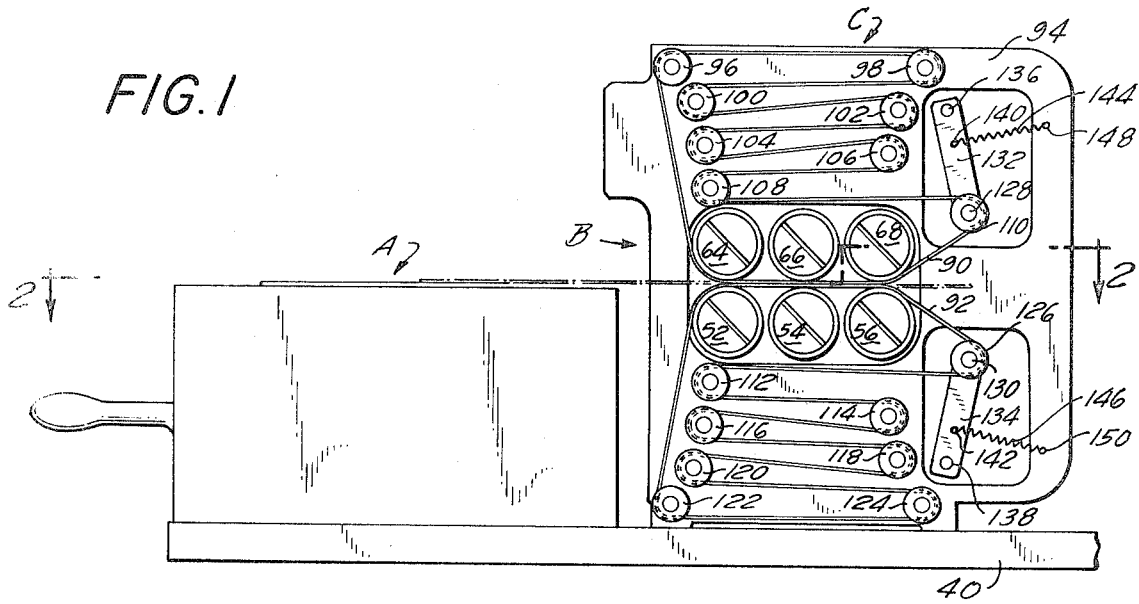

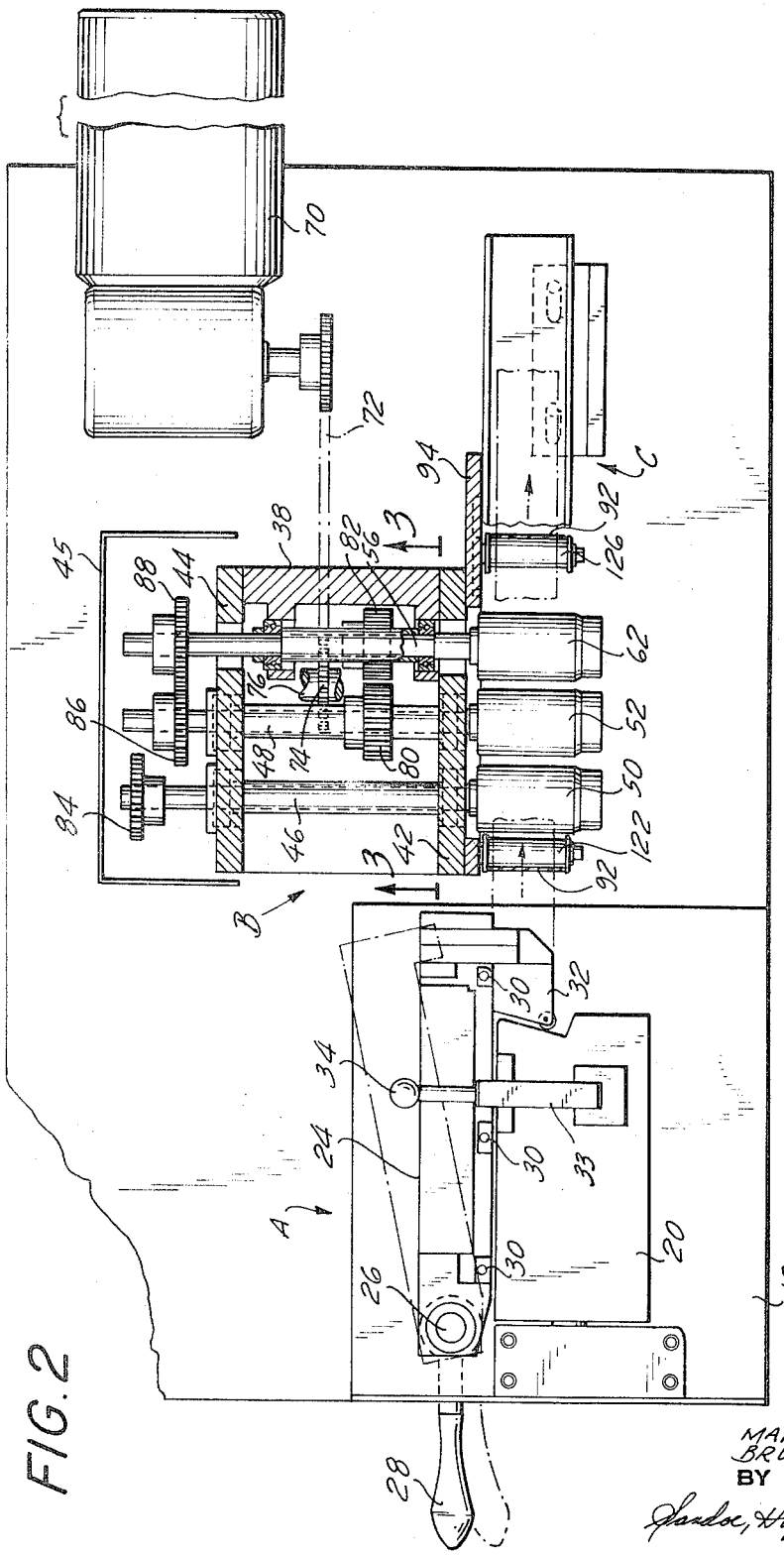

APPARATUS FOR FABRICATING LITHIUM ANODES

The present invention relates generally to metal rolling and laminating, and more particularly to a roller and laminating apparatus for use with highly malleable metals such as lithium such as for the purpose of fabricating lithium electrodes.

It has long been known that the use of alkali earth metals such as lithium, when employed as an electrode of a cell or battery, are theoretically capable of providing high power per unit weight and volume of electrode, primarily as a result of the high position of such metals in the electromotive series.

Recent developments of anhydrous liquid electrolytes for use in batteries, now permit such metals and particularly lithium to be employed as electrode in batteries such as described in co-pending application, Ser. No. 123,505, entitled "Non-Aqueous Electric Current-Producing Primary and Secondary Cells," filed on March 12, 1971, and assigned to the assignee of the present invention.

To achieve optimum battery performance with respect to power output, the surface of the lithium electrode should be made as large as is practicable. To achieve an electrode having an optimum surface area, it is generally necessary to roll the lithium metal to a predetermined length and thickness. It has also been found that the efficiency of the battery is improved when the lithium metal is formed as a laminate with another metal such as copper.

As is known, lithium is a soft, highly malleable, and as a result, it has heretofore been extremely difficult to roll and laminate lithium into thin sheets such as for use in an electrode. When attempts have been made to roll and shape sheets or foils of lithium, the lithium has adhered to the rollers and as a result, efforts at rolling and/or laminating thin lithium sheets or foils have generally met with failure.

It is thus an object of the invention to provide an apparatus which can reliably roll, form, and laminate thin sheets of soft metals such as lithium.

It is a further object of the invention to provide a rolling and laminating apparatus in which adherence of the soft metal being rolled to the rollers is substantially prevented.

It is a further object of the invention to provide an improved rolling and laminating apparatus that can be effectively employed to form laminates which include at least one foil of lithium.

It is yet another object of the invention to provide a rolling and laminating apparatus that can be reliably used in forming lithium electrodes for use in a battery.

In a conventional roller, the metal to be rolled and formed is passed into the gap between spaced sets of rollers, and is acted upon and compressed by the roller pressure so that the metal is compressed and shaped to a desired length and thickness. However, as noted above, the shaping of lithium or similar soft metals has not heretofore been feasible because of the marked tendency of those metals to adhere or stick to the roller surfaces.

In the apparatus of the invention, this tendency is prevented by the passing of an endless belt of a deformable material such as a plastic belt between the gap of the rollers, such that the metal being rolled does not contact and thus does not adhere to the roller surfaces.

In the embodiment of the invention herein disclosed, a pair of endless plastic belts is passed over the confronting surfaces of the upper and lower rollers. Those belts are maintained in tension and are advantageously passed over a series of idler rollers to increase the length of the belt.

The apparatus is particularly useful and is herein specifically described, for purposes of example, in the lamination of a lithium foil or a pair of lithium foils to a copper grid to form a unitary battery electrode having a desired length and thickness.

To the accomplishment of the above and to such further objects as may hereinafter appear, the present invention relates to a method and apparatus for rolling soft metals such as lithium, substantially as defined in the appended claims and as described in the following specification taken together with the accompanying drawings in which:

FIG. 1 is an elevation, simplified in form, of the roller apparatus of the invention.

FIG. 2 is a transverse cross-section taken across line 2—2 of FIG. 1.

FIG. 3 is a cross-section taken across line 3—3 of FIG. 2.

FIG. 4 is a perspective view of a pair of lithium foils and a copper grid prior to being laminated by the roller apparatus of the invention; and FIG. 5 is a perspective view in the approximate scale of FIG. 5, of the complete laminated electrode formed by the apparatus of the invention.

The roller apparatus of the invention has particular utility in rolling or compressing sheets or foils of a soft, highly malleable metal such as lithium into elongated sheets having a desired length and thickness. An example of the use of the apparatus is the fabrication of a lithium electrode for use in a battery as shown in FIG. 5, from the components shown in FIG. 4.

Thus, for example, with reference to FIG. 4, the initial components of the lithium electrode are two pieces of lithium foil 10 and 12 having typical dimensions of 4-7/8 in. by 1-¼ in. and a thickness of 0.015 in., and a copper grid 14. These three components are aligned and maintained in registration and are thereafter passed through the roller apparatus where they are rolled and compressed to form the completed laminated electrode generally designated 16 in FIG. 5, in which the lithium sheets and copper grid are compressed so that the thickness of each lithium foil becomes approximately 0.010 in., and the lengths of the foils and grid are increased to approximately 6-½ in. The thus laminated lithium electrode shown in FIG. 5 has a sufficient surface area for satisfactory operation in a "C" cell.

The rolling and laminating apparatus consists of, as shown in FIG. 1-3, three basic sections, a jig assembly A, a roller assembly B, and a cartridge apron assembly C. The jig assembly serves to align the three metallic strips or foils and to thereafter insert the strips which are maintained in accurate registration, into the nip of the rollers in the roller assembly B where the aligned foils are rollerd, and laminated to one another. In accordance with the invention, assembly C includes, as will be more fully described below, an endless plastic belt that passes between the gap of the rollers such that contact between the lithium foils and the confronting metallic surface of the rollers is avoided.

The provision of this endless belt which may be made from polyvinyl or polyethylene, permits the rollers to operate on a highly malleable metal such as lithium and prevents that metal from adhering to the roller surface.

The jig assembly A comprises as its major elements a frame 18, a slide 20, and a gib 22 fastened to frame 22 for guiding the longitudinal movement of slide 20. A bridge 24 is pivotally mounted on a shaft 26 and has an operating handle 28 fastened to its end remote from roller assembly B. A group of aligned dowel pins 30 are secured to and extend upward from bridge 24. Dowel pins 30 establish, when bridge 24 is in its alignment position, shown in the solid lines in FIG. 2, an edge alignment for the lithium foils and copper grid which are positioned in a channel that extends beneath slide 20.

When the lithium and copper elements are thus aligned by means of pins 30, a clamp bracket 32 is placed in position to secure these elements in a fixed and accurately registering orientation, after which bridge 24 is pivoted outwardly by the operation of handle 28.

Once bridge 24 is moved away from engagement with the aligned lithium and copper elements to the position shown in the broken lines in FIG. 2, a gate 33 is lifted upwardly by the operation of a handle 34. That movement is transferred by means of suitable gearing and linkage (not shown) to slide 20 to cause the latter to move toward the roller assembly B until the leading edges of the aligned metal foils are at the nip of the rollers in roller assembly B. At that time, clamp bracket 32 is released by suitable means (not shown) and the electrode elements are captured by the rollers. As is conventional, the foil elements are compressed and laminated to one another as they are moved through the gap between the rollers, and the length and thickness of the metallic elements are modified to a predetermined extent.

The rolling assembly B as seen best in FIGS. 2 and 3 includes a housing 38 mounted on a base 40. Housing 38 includes front and rear walls 42 and 44 and a rear cover or guard 45. A plurality of shafts are journalled in walls 42 and 44 and include portions that extend outwardly from wall 42 and carry thereon a series of rollers.

As shown in FIG. 3, a lower row of shafts 46, 48 and 50, two of which 46 and 48 are visible in FIG. 2, respectively have secured thereto such as by means of an axial screw a lower set of rollers 52, 54, and 56, and an upper row of shafts 58, 60, and 62, only one of which 56 is visible in FIG. 2, respectively have secured thereto an upper set of rollers 64, 66 and 68. A gap is defined between the upper and lower sets of rollers through which the metallic foils from jig assembly A pass and are there rolled and laminated. If desired, conventional means may be provided in roller assembly B to vary the width of that gap.

The rollers are driven, that is, caused to rotate by means of a drive motor 70 coupled through a sprocket chain 72 to a sprocket 74 carried by a shaft 76 (FIG. 3. Shaft also carries a gear 78 which engages gears 80 and 82 which are respectively fast on shafts 48 and 50. The rear ends of shafts 46–50, and 58–62 each carry sprockets, such as sprockets 84, 86 and 88, (FIG. 2), which fast on the ends of lower shafts 46, 48 and upper shaft 56 respectively. The sprockets on the central shaft in the lower and upper rows, that is, the end sprockets served to the end shafts 48 and 60, lie in common planes, as do the end sprockets secured to the other shafts. That is, the end sprockets fast on shafts 48, 58 and 62 lie in one plane, and these fast on the ends of shafts 46, 60 and 50 lie in a different common plane.

A pair of sprocket chains (not shown) are passed about each set of the end sprockets lying in the respective common planes, and over a pair of idler sprockets (also not shown in the drawings). As a result, the rotation imparted through the motor-driven sprocket gear 78 to shaft 48 is imparted through the outer sprockets to shafts 58 and 62, and similarly, the rotation imparted through gear 78 to shaft 50 by motor 70 is imparted to shafts 46 and 60.

What has thus far been described is a conventional jig assembly for feeding an aligned set of metallic foils to a conventional roller assembly at which those foils are rolled and laminated into a unitary electrode assembly. Whereas the conventional roller assembly has been found to be satisfactory for rolling relatively hard or non-malleable metals, it has heretofore been totally unsatisfactory for rolling and laminating highly soft or malleable metals such as lithium, as a result of the marked tendency for the soft metal to adhere to the surface of the rollers. The present invention, by the provision of cartridge apron assembly C, permits the otherwise conventional roller assembly B to be employed in the lamination of soft metals, and significantly prevents the difficulties of the convention rolling apparatus by preventing the unwanted adherence of the metal to the roller surfaces.

To this end, a pair of endless belts 90 and 92 made of deformable plastic material, such as polyethylene or polypropylene, are respectively passed over the upper and lower groups of rollers, such that a portion of those belts is passed through the gap between the rollers and is always interposed between the roller surfaces and the exposed surfaces of the lithium foils being rolled and laminated. It has been found that the provision of these belts prevents the lithium foils from adhering to the roller surfaces and thus enables the lithium foils to be effectively and reliably rolled and laminated.

As shown best in FIG. 1, the belt 90 is passed over a series of spools or idler rollers mounted on a base 94, which in turn is mounted onto the roller assembly housing so that the plastic belts are positioned in the roller gap as described. Thus, as shown, belt 90 is passed in a seprentine manner over a series of idler rollers 96–110 and belt 92 is similarly passed in a serpentine fashion over a series of idler rollers 112–126.

The idler roller 96–108 and 112–124 are rotatably mounted on a series of shafts, which are in turn secured to base 94 of the cartridge assembly. Rollers 110 and 126 are rotatably carried on shafts 128 and 130 respectively, those shafts in turn being respectively secured to tensioning arms 132 and 134. Arms 132 and 134 are in turn pivotally mounted to base 94 at pivot screws 136 and 138 respectively, and pins 140 and 142 are respectively secured to and extend from arms 132 and 134 at an intermediate location on the arms. The opposite ends of a pair of extrusion springs 144 and 146 are respectively affixed to pins 140 and 142 and to posts 148 and 150 secured to base 94. The tension of springs 144 and 146 is empirically determined and selected so that arms 132 and 134 are pivoted by the force of those springs to impart an empirically determined, optimum tension in plastic belts 90 and 92. In operation, belts 90 and 92 are moved about their serpentine path about the idler rollers, as a result of the rotation of the laminating rollers, such that the portion of the belt in contact with the laminating rollers and the lithium foils is continuously changing. The arrangement of the plastic belts about the idler rollers in the serpentine manner shown, permits the employment of a greater length of the belt in a given area which has the beneficial result of reducing the wear on the surfaces of the belts, and of thereby increasing the useful life of the belts.

The provision of the plastic belt in the gap between the laminating rollers in the manner herein described has been found to be highly effective in laminating soft metals such as lithium, as it reliably prevents the unwanting adherence of the soft metal to the peripheral surfaces of the laminating rollers. A precise explanation of this phenomenon is not available at the present time, but it is believed that the slight deformation of the plastic belts as opposed to the non-deformability of the metal rollers, is the mechanism that prevents the unwanted adhering of the lithium to the laminating rollers and to the plastic belts.

As a result of this unexpected and highly beneficial result, it is now possible to roll and laminate sheets or foils of soft, highly malleable metals such as lithium into desired lengths and thicknesses such as for use in a battery electrode for which lithium has, in particular, exhibited highly desirable characteristics.

Whereas, the invention has been herein disclosed with respect to a single embodiment it will be understood that modifications may be made therein all without departing from the spirit and scope of the invention.

We claim:

1. A method for rolling a foil of a highly malleable metal such as lithium by the use of a pair of spaced metal rollers having a gap defined therebetween, which comprises the steps of passing a first endless plastic belt into said gap and over the surface of one of said rollers, passing a second endless plastic belt over the other of said rollers, and moving said metal foil in the gap between said rollers and between confronting portions of said first and second endless belts, whereby said foil is compressed by the action of said rollers without adhering to said rollers, maintaining each of said plastic belts at a predetermined tension, and moving said belts through said gap.

2. The method of claim 1, further comprising the step of arranging said belt in the form of a serpentine.

3. An apparatus for rolling and laminating a pair of sheets or foils of lithium, said apparatus comprising a pair of upper and lower spaced metal rollers having a gap defined therebetween for receiving therein said sheets or foils, a first endless plastic belt having a portion passing over the lower peripheral surface of said upper roller, a second endless plastic belt having a portion passing over the upper peripheral surface of said lower roller in confronting relationship with the lower peripheral surface of said upper roller, means for passing said lithium sheets into said gap and between said confronting portions of said first and second plastic belts, whereby said sheets are compressed and laminated between said rollers without adhering to said rollers, and means for maintaining each of said belts at a predetermined tension.

4. The apparatus of claim 3, further comprising a base, and a plurality of rollers rotatably mounted on said base, said belt being passed over said plurality of rollers and arranged in the form of a serpentine.

5. The apparatus of claim 4, in which said tension maintaining means comprises resilient means secured at one end to said base, and an arm pivotally mounted on said base and carrying one of said plurality of rollers, the other end of said resilient means being secured to said arm.

6. The apparatus of claim 3 further comprising a rotatably mounted idler roller, a portion of said belt being passed over said idler roller, said idler roller providing for transverse movement of said belt through said gap.

7. The apparatus of claim 6, further comprising a base supporting said pair of spaced rollers, an arm pivotably secured to said base at one end and carrying said idler roller, said tension maintaining means comprising resilient means attached at one end to said base and at its other end to said arm.

* * * * *